April 19, 1927.  1,625,565
A. ROSENBERG ET AL
SIGNALING AND DIRECTION INDICATING APPARATUS FOR AUTOMOBILES
Filed Feb. 10, 1922     3 Sheets-Sheet 3
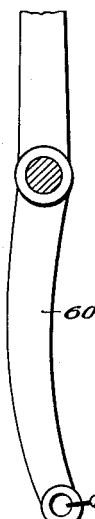
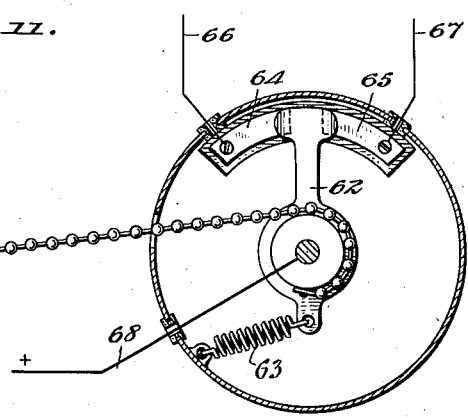
Fig. 11.
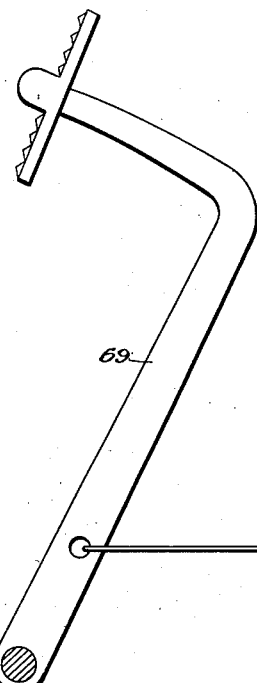
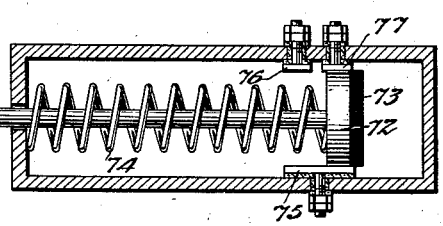
Fig. 12.
WITNESSES
W. G. Jones
Robert S. Hulsizer
INVENTORS
A. Rosenberg
W. Ollinger
BY
Munn & Co
ATTORNEYS Patented Apr. 19, 1927.

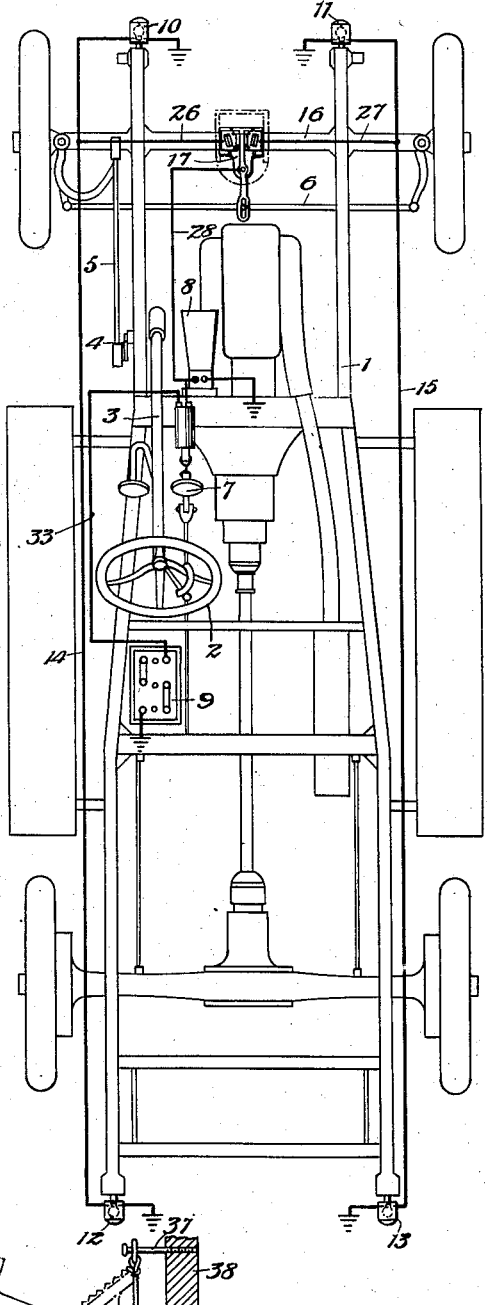

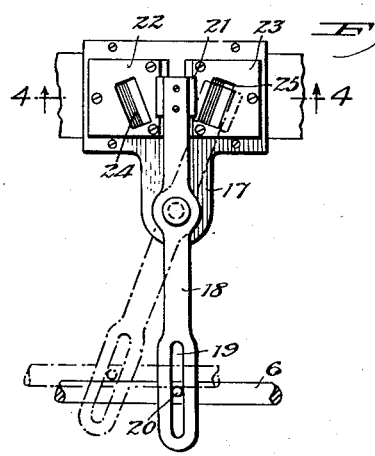
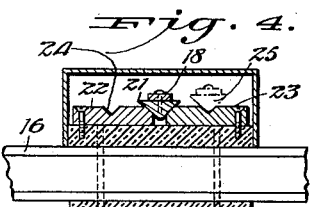
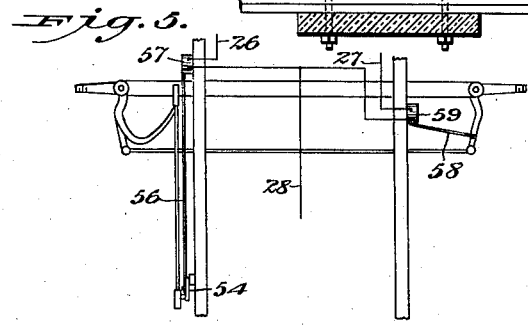
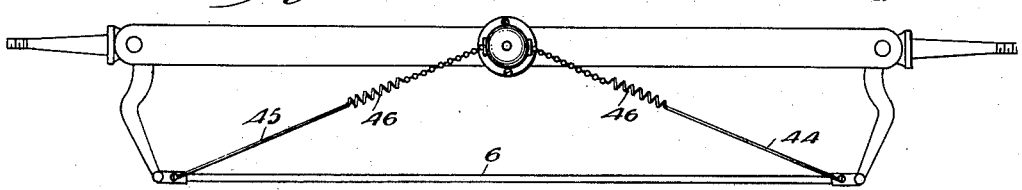
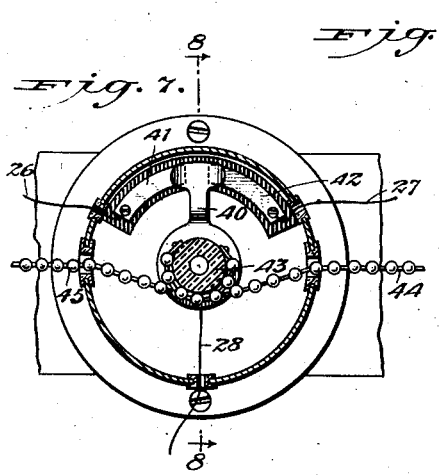
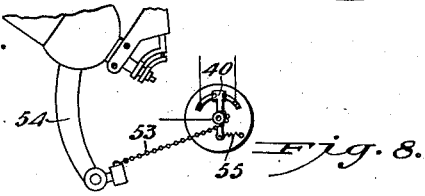
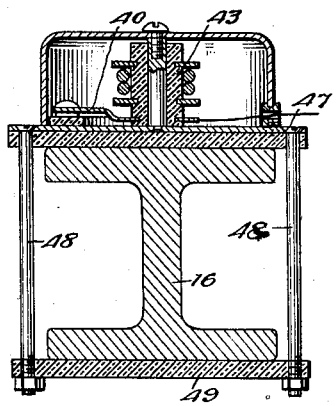
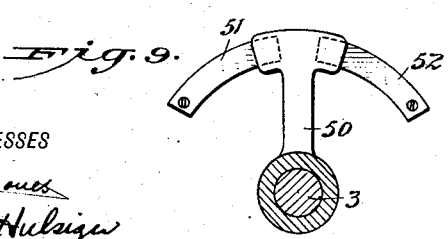

1,625,565

UNITED STATES PATENT OFFICE.

ABRAHAM ROSENBERG AND WILLIAM OLLINGER, OF NEW YORK, N. Y., ASSIGNORS TO F. THOMAS MOORE, OF WASHINGTON, DISTRICT OF COLUMBIA.

SIGNALING AND DIRECTION-INDICATING APPARATUS FOR AUTOMOBILES.

Application filed February 10, 1922. Serial No. 535,551.

This invention relates to apparatus to be applied to automobiles for the purpose of signaling and indicating the direction of movement of the automobile.

An object of the invention resides in the provision of means whereby the movement of the steering apparatus, combined with the action of the brake, will cause a signal to be selectively actuated to indicate the impending change in the direction of the car, either by means of an audible signal or by means of a visual signal.

Another object resides in the provision of means whereby whenever the brake is pressed an audible signal is given, regardless of the position of the steering apparatus.

A further object resides in the provision of means whereby whenever a brake is actuated a definite succession of signals is given, not only indicating the imminence of a change in direction but also indicating the character of the change.

A further object of the invention is to provide, in a manner as hereinafter set forth, a signaling and direction indicating apparatus for motor vehicles whereby it necessitates the application of the brake, to give a turn signal, which tends to discourage reckless turning of corners.

A still further object resides in the provision of means whereby the signaling apparatus associated with the steering mechanism is connected to a part of the steering mechanism in such a way that a minimum amount of variation and adjustment in the operation of the apparatus results.

Another object resides in the provision of apparatus which can be applied to any type of car with the necessity for only a minimum amount of alteration in the structure and arrangement of the parts of the car.

A further object resides in the particular construction and arrangement of parts which are hereinafter described and claimed and shown in the accompanying drawings.

The invention is illustrated in the drawings, of which—

Figure 1 is a plan view of an automobile chassis showing the signaling apparatus attached thereto.

Fig. 2 is a sectional view of a circuit switch operated by the foot brake.

Fig. 3 is a partial plan view of a circuit switch operated by the steering apparatus.

Fig. 4 is a section taken on the line 4—4 of Fig. 3.

Fig. 5 is a partial plan view of a modified form of apparatus.

Fig. 6 is a plan view of a still further modified form of switch operated by the steering apparatus.

Fig. 7 is a horizontal section of the switch shown in Fig. 6.

Fig. 8 is a vertical section taken on the line 8—8 of Fig. 7.

Fig. 9 is a horizontal section taken through the switch operated directly from the steering post.

Fig. 10 is a partial elevation of the connection between a circuit switch and the pitman arm of the steering apparatus.

Fig. 11 is a partial sectional view showing a single switch operated by a hand brake.

Fig. 12 is a similar view of a circuit switch operated by the foot brake.

The form of the invention shown in the drawings is a preferred form, although it is understood that modifications in the construction and arrangement of the parts and in the character of the materials used may be adopted without departing from the spirit of the invention.

One form of application of our invention is illustrated in Fig. 1. This application applies to an automobile having a chassis frame 1, a steering wheel 2, steering post 3, a pitman arm 4, thrust bar 5, and steering quadrant arms 6. It is also provided with a brake pedal 7, a horn 8, and a battery 9. In the front of the automobile at the sides thereof, and connected to the frame in any suitable manner, are signal lights 10 and 11. At the rear of the automobile are disposed a pair of similar lights 12 and 13. The lights 10 and 12 are disposed on one side and the lights 11 and 13, on the other at the front and rear. These lights are grounded, and the lights 10 and 12 are connected by a wire 14, whereas the lights 11 and 13 are connected by a wire 15. Mounted on the machine at any suitable point, but preferably the front axle 16, is a switch member 17, shown in detail in Figs. 3 and 4. This switch member comprises a pivoted switch arm 18 having a slot 19 in its rear end engaging a pin 20 on the quadrant arm or bar 6. The front end of the switch is provided with a contact plate 21 which in the normal middle position of the switch, as shown in full lines in the figure, engages with two terminal plates 22 and 23. The under face of the contact plate 21 is preferably pointed or tapered to engage with tapered recesses 24 and 25 in the terminal plates 22 and 23, respectively. The plate 22 is connected by a wire 26 to the wire 14. The plate 23 is connected by a wire 27 to the wire 15. The switch arm 18 is connected by a wire 28 to the horn 8 and to a terminal 29 mounted on a casing 30. This casing contains a movable switch member 31 moved in one direction by the brake pedal 7. The movement of the switch member 31 in the other direction is controlled by a spring 31$^a$. The casing also contains a terminal 32 disposed adjacent the terminal 29, the terminal 32 being connected by a wire 33 to the battery 9. The battery, of course, is grounded.

The switch member 31 is provided on its end with a contact plate 34 adapted in one position thereof to bridge the terminals 29 and 32 whereby a circuit is established between the wires 28 and 33. This contact is made when the brake pedal is moved to any definite position, such as that shown in dotted lines in Fig. 2. This movable switch member 31 is provided with a rod 35 loosely connected to a connection or cable 36 one end of which is connected to the brake pedal 7 and the other end of which may be fastened to any suitable fixed point 37 on some part of the machine, such as the dash- or instrument-board 38. In the cable 36 between the rod 35 and the pedal 7 is disposed an obstruction, such as a knot 39, so that if the cable is connected to the fixed point 37 in the manner shown, the rod 35 is designed to have been pulled back far enough so that it will not make contact between the terminals 29 and 32 although the brake pedal may be depressed.

In the form of the invention, therefore, shown in Figs. 1, 2, 3 and 4, a current from the battery is contributed to the horn and to the lights whenever the brake pedal is depressed. If the steering mechanism is in the position for straight ahead movement of the car, then the switch arm 18 is in its middle position and current is supplied to all the lights, so that all the lights are lit, indicating that the pedal has been depressed and that the car speed is being checked although the car is moving straight ahead. Now, if the steering mechanism is operated to turn the car in one direction or the other, the switch lever 18 will become disengaged from one or the other of the plates 22 and 23 so that the lights on one side of the car will go out but the lights on the other side of the car will remain lit. In accordance with the arrangement of the parts, if the car is turned to the left the switch lever 18 will contact with the plate 22 only, thus maintaining the illumination of the lights on the left side of the car, which will indicate that the car is turning or about to turn in that direction. It will also be noted that whenever the brake pedal 7 is depressed a definite distance, the horn will give an audible signal of any pending change in the motion of the car. Neither the lights nor the horn are actuated, however, if only a very light pressure is applied to the brake. This brake, of course, may be either the foot brake, as shown, or any other brake, whether operated by foot or by hand.

In Figs. 6, 7 and 8 we illustrate a modified form of switch which may replace the switch element 17 previously described. This comprises a rotatable switch arm 40 disposed to contact with two plates 41 and 42 in the normal middle position of the arm. This arm is connected to a post 43 to which two chains 44 and 45 are connected in opposing relations. The other ends of these chains or connections 44 and 45 are engaged, as shown in Fig. 6, with opposite ends of the steering arm or rod 6 which forms one of the elements of the steering apparatus. Resilient means such as 46 may be disposed in the length of each of these connections 44 and 45 to maintain a certain tension therein. This switch may be mounted on a plate 47 connected by bolts 48 to a plate 49 on the underside of the axle 16. The terminal plate 41 is connected with the wire 26; and the plate 42, with the wire 27, the switch lever or plate 40 being connected to the wire 28. The operation of this switch is similar to the operation of the switch 17 previously described. The connection of the switch through the links 44 and 45 is, however, more flexible and not as rigid as the connection previously described, so that it will effectively operate although the parts to which it is connected may be subjected to a certain amount of vibration.

In Fig. 9 we show a switch arm 50 connected to the bottom of the steering post 3 and adapted to contact with plates 51 and 52 which are connected to the electrical circuit in a manner similar to that described with respect to the previous pairs of plates, so that the switch arm is actuated directly by the movement of the steering post 3.

In Fig. 10 we show a switch similar to the switch shown in Fig. 7, connected by a link or cable 53 directly to the pitman arm 54. The pitman arm will move the switch arm 40 in one direction, indicated by the arrow in Fig. 10, and a spring 55 will move the switch arm in the other direction when the connection or link 53 is not pulling the arm. This modification provides a direct connection between the switch and the pitman arm so that the switch will be operated directly by a member the action of which is gradually in conformation with the movement of the steering wheel and which varies to a minimum degree from the action of said wheel, so that the switch arm is at all times accurately in conformance to the degree of steering of the car.

In Fig. 5 we show a direct connection 56 between the pitman arm 54 and a switch 57 mounted on the frame. We also show a connection 58 between the steering quadrant and another switch 59 also mounted, preferably, on the frame. The switch 57 is connected in any desired manner between the wire 28 and the wire 26, whereas the switch 59 is connected between the wire 28 and the wire 27.

In Fig. 11 we show a switch of the form illustrated in Fig. 10 adapted to be operated by a hand-brake lever 60, which may be the emergency brake lever. This lever is connected by a chain or link 61 to the switch arm 62 to move it in one direction, whereas the spring 63 is adapted to move it in the opposite direction. This switch is provided with terminal plates 64 and 65, one connected by wire 66 to the horn and the other by a wire 67 to the lights, the switch arm 62 being connected by a wire 68 to the battery. In the middle position of the switch arm 62, shown in the figure, the battery is connected to the horn and the lights, so that an audible as well as a visual signal is being given. When the lever, however, contacts only with the terminal plate 64 the horn alone is sounded, whereas when the lever contacts only with the plate 65 the lights only are illuminated and the horn is silent. When the emergency brake lever is off, the switch lever is in the extreme left-hand position, out of contact with the plate 64. This emergency lever is constructed in the usual manner with notches so that it can be definitely adjusted in any desired position. As it is gradually applied, the switch lever comes in contact with the plate 64 and the horn commences to sound. As the brake is further applied, the switch lever 62 is moved to the intermediate position shown, in which the lights and horn are both actuated. A further movement of the brake will cause the lights alone to be lit. When the brake is fully applied, the lever is in extreme right-hand position out of contact with the terminal plate 65, so that not only is the horn silent but the lights are extinguished.

In Fig. 12 we show a similar device operated preferably from a foot-brake pedal 69. The connection extends from the pedal, through the link 70, to a rod 71. This rod 71 is provided with a head 72 and an insulated plate 73 on the end. A spring 74 tends normally to force the head 72 forward. This head is made of conducting material and is adapted to slide along and contact with a terminal plate 75 at one side and to engage with contact plates 76 and 77 at another point. The plate 76 is adapted to be connected to the horn, and the plate 77, to the light circuit, whereas the plate 75 is connected to the battery; therefore, in the position shown in the figure, the battery is connected to the lights only. In a position slightly further to the left, the battery would be connected to the horn as well as the lights. In a still further left-hand position, the battery would be connected only to the horn. In the extreme left-hand position, the horn and the lights would be disconnected entirely from the battery; and in the extreme right-hand position, the same condition would exist. Therefore, upon a slight actuation of either of these brake mechanisms, only a braking action takes place, but as the brakes are progressively applied, first the horn, then the horn and the lights are actuated. Further movement causes the actuation of the lights alone, and when the brakes are fully set, the lights are extinguished.

It will be understood, of course, that these lights, preferably, are signal lights separate from the ordinary lights of the car, or they may form part of the same system.

It is apparent that we have provided a simple, efficient combination of apparatus which can be applied to practically any type of automobile without materially altering the construction of the car, and which is very easily and accurately operated merely through the operation of the brakes and the movement of the steering apparatus. The various modifications shown are illustrated because on some types of car one form would be preferable to another. The main purpose of the invention is to indicate a visual or an audible signal, or both, whenever the brake is pressed to such a degree that the speed of the car is materially checked, and that thereafter whenever the direction of the car is changed the visual signals will clearly indicate the direction in which it is moved or about to move. The fact that the horn is actuated as soon as the pedal is pressed beyond a certain amount, will give a clear, sharp signal warning other drivers of the fact that a change is about to take place, and then the selective illumination of the light in response to the movement of the signaling mechanism will clearly indicate the change so that the drivers can govern themselves accordingly. Since the essential actions take place whenever a car speed is altered in any way, requiring the movement of a brake or a movement of the steering wheel, or both, it will be seen that the operation of the signaling mechanism disclosed in this application is practically automatic, for whenever such a change is effected the apparatus will respond immediately and selectively signal and indicate the change.

What we claim is:

In an electric signaling system for a vehicle having a steering mechanism and a brake mechanism; the combination of a right direction signal, a left direction signal, a switch having two stationary contacts, a conductor between each stationary contact and one of the signals respectively, a movable contact member in the switch including means for contacting either one of the stationary contacts singly when moved to either side of a neutral position, and for contacting both stationary contacts simultaneously when in neutral position, means actuating the movable contact member upon movement of the steering mechanism and means electrically energizing the movable contact member upon actuation of the brake mechanism.

ABRAHAM ROSENBERG.
WILLIAM OLLINGER.